2 Sheets--Sheet 1.
T. A. WESTON.
Improvement in Differential Pulleys.
No. 4,971. Reissued July 9, 1872.
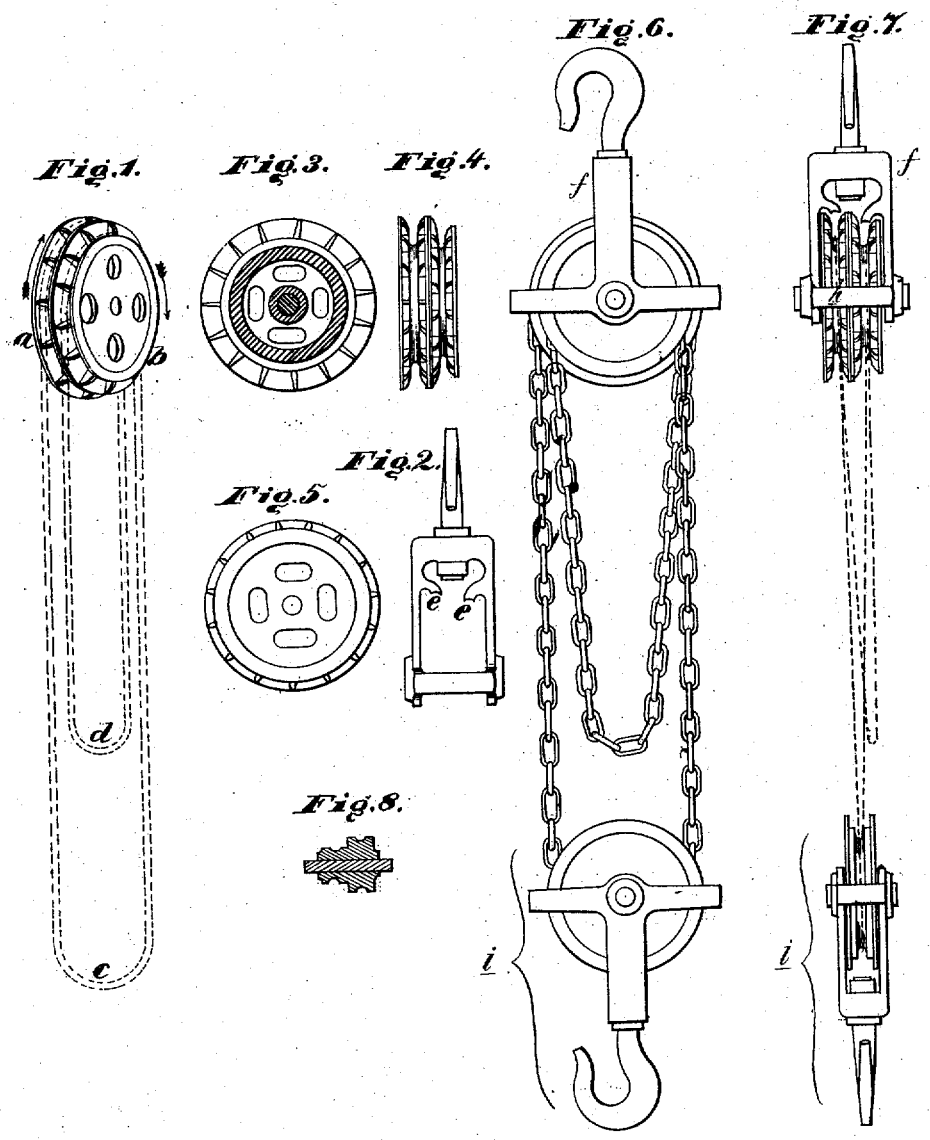
WITNESSES.
J. Fraser.
Charles M. Higgins
INVENTOR.
Thomas Aldridge Weston.

2 Sheets--Sheet 2.

T. A. WESTON.

Improvement in Differential Pulleys.

No. 4,971. Reissued July 9, 1872.

WITNESSES.

J. Fraser

Charles M. Higgins

INVENTOR.

Thomas Aldridge Weston.

UNITED STATES PATENT OFFICE.

THOMAS ALDRIDGE WESTON, OF RIDGEWOOD, NEW JERSEY.

IMPROVEMENT IN DIFFERENTIAL PULLEYS.

Specification forming part of Letters Patent No. 67,470, dated August 6, 1867; reissue No. 4,971, dated July 9, 1872.

*To all whom it may concern:*

Be it known that I, THOMAS ALDRIDGE WESTON, engineer, of Ridgewood, Bergen county, New Jersey, have invented certain new and useful Improvements in Differential Pulleys, of which the following is a specification:

My invention relates to that form of hoisting-tackle in which the purchase is obtained by a chain-sheave of two different diameters engaged or geared to an endless chain, and operating therewith upon the principle of the differential axle or Chinese windlass. My invention consists, first, in molding or shaping each rim or face of the differential sheave with a deep central groove, and on each side thereof recessed flanges and webs or ribs, as hereinafter fully described, by which conformation of face the said sheave is adapted for gearing to and engaging with the chain-links more effectively than by the means proposed prior to my invention; secondly, in combining with the said differential sheave a new safety device or keepers for preventing the accidental disengagement of the chain-links from the differential sheave; thirdly, in making the differential sheave with more than two sets, consisting of peripheries differing in diameter, to give various speeds in lifting; fourthly, in combining the aforesaid parts with an endless chain in a suitable frame.

Figure 10:
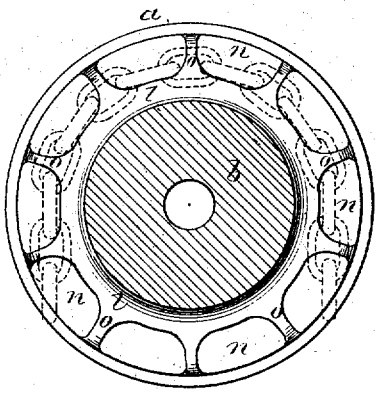
Figure 11:
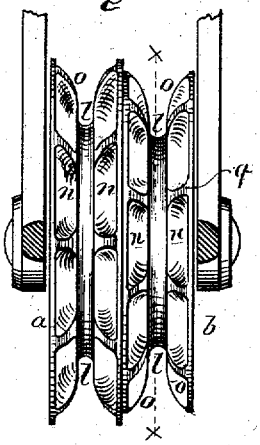
Figure 9:
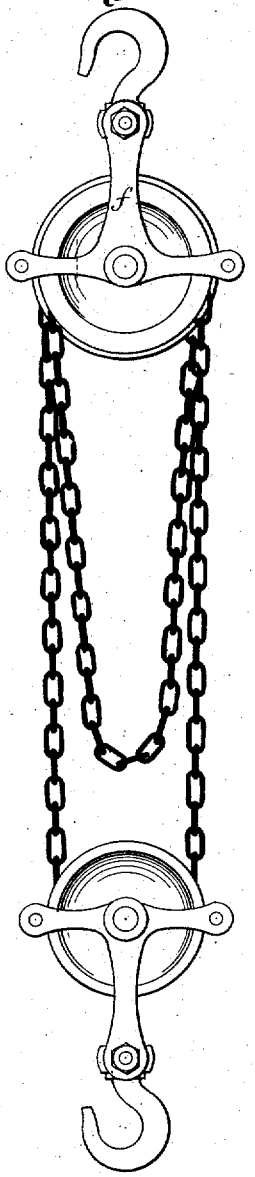
Figure 12:
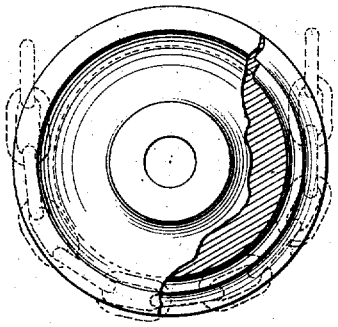
Figure 13:
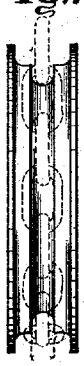

In the accompanying drawing, Figure 1, Sheet 1, is a perspective view of the differential sheave with its rims formed according to my invention and the course of the chain shown in dotted lines. Fig. 2 is an end elevation of the frame for supporting the said differential sheave, showing also the safety device or keepers E E. Fig. 3 is a vertical section of the differential sheave through its larger diameter, Fig. 4 being an edge view and Fig. 5 a side view of the same. Fig. 6 is a side view of my improved differential pulley complete, and Fig. 7 is an edge view of the same with the course of the chain shown in dotted lines. Fig. 8 is a section of a roller or rollers and shaft, which may be used instead of the stationary keepers in Fig. 2 to prevent the disengagement of the chain-links from the differential sheave. Fig. 9, Sheet 2, is a side view of my improved pulley drawn from and in exact conformity with the model deposited in the United States Patent Office with my original application. Fig. 10 is a vertical section of the differential sheave through its smaller diameter at the dotted line in Fig. 11, which latter is an edge view; and both figures are drawn in exact conformity with the aforesaid model, and to an enlarged scale for the better illustration of my improved mode of forming the peripheries or rims. Figs. 12 and 13 represent the plain grooved sheave placed in either loop of the chain in connection with a suitable frame and hook, as shown in Fig. 9.

The endless chain is applied as shown in Fig. 1—that is to say, it is coiled twice around the differential sheave, forming two depending loops, each loop having its two sides hanging, respectively, from the larger and smaller peripheries on opposite sides of the axis. The action is as follows: By rotating the differential sheave in the direction of the arrows in Fig. 1 the larger periphery *a* at each revolution takes up a length of chain equal to its circumference from the loop *c*, the said loop receiving simultaneously a length of chain equal to the lesser circumference of the periphery *b*. The loop *c*, thus receiving less chain per revolution than is taken from it, is gradually shortened, causing the bight to ascend together with the plain pulley suspended therein, and any attached load. The other loop, *d*, is mean time equally lengthened by receiving at each revolution more chain over the larger periphery *a* than is simultaneously taken from it over the smaller one, *b*, and by rotating the differential sheave in an opposite direction the motion of the loops is reversed. This differential action of the said sheave upon the chain and the resultant gain of power would be lost if the chain could slip over the peripheries of the sheave—that is, unless the portions of chain in contact with the said sheave were securely interlocked therewith while passing over it. It is also necessary that the links should enter into and leave their engagement with the said sheave freely and as rapidly as the chain passes.

It was proposed, prior to my invention, to effect this engagement of the chain to the differential sheave by providing the latter with spikes or pins designed to enter within the eyes or openings of the links. This method requires the chain-links to be guided with extreme precision over and onto the points of the pins, and even then the engagement is uncertain from the constant tendency of the chain —loaded or strained on one side only—to ride clear off the points of the pins, and such pins, projecting unsupported from the face of the sheave, are also liable to injury by bending or otherwise.

To obviate these defects I mold each face or periphery of the differential sheave with a deep central groove, *l*, and on either side of it recessed flanges *n n* and webs *o o*. Those links which present themselves edgewise to the differential sheave are received into the groove *l*; the intermediate links, presenting themselves flatwise to the sheave, are guided by the flanges *n* and webs *o* down into the recesses thus formed, where the said links are securely held, being shrouded in the solid metal of the sheave. The recessed flanges and webs diverge from each other, opening wider outwardly, so that when the position of the operator or of the load requires it the chain can approach and leave the differential sheave obliquely. By this conformation of the peripheries the necessity of using the weak and exposed pins or spikes is obviated, and a secure, durable, and free working engagement between the chain and differential sheave is obtained without complexity of structure.

In order to render the accidental disengagement of the chain-links impossible I employ a double roller, Fig. 8, beneath which the links can only pass when embedded securely within the cells or spaces provided for them in the rims of the differential sheave; or, as an equivalent device, the rigid keepers E E may be employed.

The differential sheave may have more than two sets, each consisting of peripheries differing in diameter, upon any two of which peripheries the endless chain may be applied so as to furnish a variety of speeds in lifting.

By preference I cast the differential sheave, formed as described, in one piece; but each periphery or diameter may be formed as a seprate or single sheave, provided they are so affixed to each other as to form, in effect, a single piece.

Having described my invention, I would state that I do not confine myself to the precise details herein described, as the same may be varied without departing from the nature of my invention; but

I claim—

1. A differential sheave, consisting of two or more united sheaves of dissimilar diameters, having their peripheries provided with a deep central groove, *l*, recessed flanges *n n*, and webs *o o* for gearing the said differential sheave to a chain, substantially as specified.

2. The safety-roller or equivalent fixed keepers, in combination with the said differential sheave, as and for the purposes set forth.

3. The aforesaid differential sheave, constructed as described, in combination with an endless chain and a supporting-frame, substantially in the manner set forth.

THOMAS ALDRICH WESTON.

Witnesses:

J. FRASER,

CHARLES M. HIGGINS.